(12) United States Patent
Yang

(10) Patent No.: US 11,162,967 B2
(45) Date of Patent: Nov. 2, 2021

(54) APPARATUS FOR MEASURING SPEED OF VEHICLE HAVING IN-WHEEL MOTOR

(71) Applicant: HYUNDAI MOBIS CO., LTD., Seoul (KR)

(72) Inventor: Hae Jun Yang, Pyeongtaek-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 303 days.

(21) Appl. No.: 16/018,062

(22) Filed: Jun. 26, 2018

(65) Prior Publication Data

US 2019/0101564 A1     Apr. 4, 2019

(30) Foreign Application Priority Data

Sep. 29, 2017   (KR) .......................... 10-2017-0126649

(51) Int. Cl.
| | |
|---|---|
| *G01P 3/44* | (2006.01) |
| *G01P 3/487* | (2006.01) |
| *B60W 30/00* | (2006.01) |
| *B60T 8/171* | (2006.01) |
| *B60T 8/32* | (2006.01) |

(52) U.S. Cl.
CPC ............... *G01P 3/44* (2013.01); *B60T 8/171* (2013.01); *B60T 8/329* (2013.01); *B60W 30/00* (2013.01); *G01P 3/487* (2013.01)

(58) Field of Classification Search
CPC .. G01P 3/44; G01P 3/487; G01P 3/42; B60W 30/00; B60W 2520/28; B60W 40/105; B60T 8/171; B60T 8/329; B60K 7/0007; B60Y 2400/303; B60L 2220/46
See application file for complete search history.

(56) References Cited

U.S. PATENT DOCUMENTS

| | | | |
|---|---|---|---|
| 2013/0073162 A1 | 3/2013 | Kim | |
| 2014/0011620 A1* | 1/2014 | Munster | .............. B60K 17/046 |
| | | | 475/149 |
| 2018/0335441 A1* | 11/2018 | Hammerschmidt | ...... G01P 3/44 |
| 2019/0086440 A1* | 3/2019 | Pommies | ................ F16H 48/38 |

FOREIGN PATENT DOCUMENTS

| | | | | |
|---|---|---|---|---|
| CN | 203502430 | * | 3/2014 | |
| JP | WO 02/076813 | * | 3/2001 | ............. B62J 99/00 |
| KR | 10-1219350 B1 | | 1/2013 | |
| KR | 10-1766139 | | 8/2017 | |
| WO | WO-2017162942 A1 | * | 9/2017 | ............. F16H 48/38 |

OTHER PUBLICATIONS

Amain hobbies, Robinson Racing Steel Spur Gear & Slipper Pad, Aug. 2016 (Year: 2016).*

* cited by examiner

*Primary Examiner* — Eric S. McCall
*Assistant Examiner* — Timothy P Graves
(74) *Attorney, Agent, or Firm* — H.C. Park & Associates, PLC

(57) ABSTRACT

An apparatus for measuring a speed of a vehicle having an in-wheel motor may include: a transmission gear configured to be rotated by power transmitted from the in-wheel motor, and including a mounting groove formed along a circumferential direction; a measurement target having magnetic force and mounted in the mounting groove; and a speed sensor installed at a position spaced apart from the measurement target and configured to measure rotation of the measurement target part.

8 Claims, 14 Drawing Sheets

APPARATUS FOR MEASURING SPEED OF VEHICLE HAVING IN-WHEEL MOTOR

CROSS-REFERENCES TO RELATED APPLICATION

This application claims priority from and the benefit of Korean application No. 10-2017-0126649, filed on Sep. 29, 2017, which is hereby incorporated by reference for all purposes as if fully set forth herein.

BACKGROUND

Field

Exemplary embodiments/implementations of the invention relate generally to an apparatus for measuring the speed of a vehicle having an in-wheel motor and, more specifically, to an apparatus for measuring the speed of a vehicle having an in-wheel motor, which is capable of sensing the speed of the vehicle by mounting a magnetic encoder to a gear configured to be rotated by power transmitted from the in-wheel motor.

In general, an in-wheel driving device pertains to a technology used in vehicles such as electric vehicles using electricity as power sources. Unlike a driving method of a gasoline or diesel vehicle in which wheels are rotated by power transmitted from an engine via a transmission and a driving shaft, the in-wheel driving device is a technology in which power is directly transmitted to the wheels by motors installed in left and right driving wheels or four front, rear, left and right driving wheels.

Discussion of the Background

A vehicle having an in-wheel motor is provided with a speed sensing device which may operate, interlocking with an anti-lock brake system (ABS) and an electronic stability controller (ESC).

The ABS for a vehicle is a kind of safety device which senses variation in speed of wheels of the vehicle which are rotating while sudden braking and prevents the wheels from locking up. Furthermore, the ESC for a vehicle is a device which senses a vehicle speed, a steering angle, lateral acceleration, a yaw rate, etc. and controls respective braking oil pressures of four wheels, thus preventing the vehicle from leaning to one side while cornering.

In a conventional art, a device for sensing the speed of a wheel of a vehicle has been used, in which a plurality of protrusions and grooves are formed on an outer circumferential surface of a gear which is rotated by power transmitted from a motor, and a sensor is installed around the gear to sense a difference in height between the protrusions and the grooves and thus sense the speed of a vehicle.

However, the conventional art is problematic in that, because the device for sensing the speed of the wheel of the vehicle is installed on a hub bearing, a separate sealing part for preventing oil leakage is required, whereby the number of manufacturing processes is increased. Furthermore, separate space is needed to install parts for sensing the protrusions and grooves formed on the outer circumferential surface of the gear, and there is high possibility for the separate space to interfere with other parts. Therefore, there is a need to improve the conventional configuration.

The above information disclosed in this Background section is only for understanding of the background of the inventive concepts, and, therefore, it may contain information that does not constitute prior art.

SUMMARY

Embodiments of the present invention are directed to an apparatus for measuring a speed of a vehicle having an in-wheel motor, which is capable of sensing the speed of the vehicle by mounting a magnetic encoder to a gear configured to be rotated by power transmitted from the in-wheel motor.

Additional features of the inventive concepts will be set forth in the description which follows, and in part will be apparent from the description, or may be learned by practice of the inventive concepts.

In one embodiment, an apparatus for measuring a speed of a vehicle having an in-wheel motor may include: a transmission gear configured to be rotated by power transmitted from the in-wheel motor, and including a mounting groove formed along a circumferential direction; a measurement target having magnetic force and mounted in the mounting groove part; and a speed sensor installed at a position spaced apart from the measurement target and configured to measure rotation of the measurement target part.

The transmission gear may include: a gear body having an annular shape and comprising gear teeth formed along an outer circumferential surface of the gear body to receive the power of the in-wheel motor; a base including the mounting groove and installed in a shape covering an inner side of the gear body; and a connection rod protruding from the base.

The mounting groove may include: a first mounting groove having a groove formed in a circumferential direction inside the base facing the gear body; and a second mounting groove stepped from the first mounting groove and having a groove formed in the circumferential direction inside the base.

The measurement target may include: a bracket inserted into and fixed in the mounting groove part; and a magnet fixed in the bracket and having the magnetic force.

The bracket may include a first bracket bent in a shape enclosing an inner corner of the mounting groove part, the first bracket extending in the circumferential direction.

The bracket may include a second bracket force-fitted into the mounting groove and having an annular shape with an "L"-shaped cross-section.

The bracket may include a third bracket force-fitted into the mounting groove and having an annular shape with a "U"-shaped cross-section.

The bracket may include a fourth bracket fixed in a force-fitting manner in both the first mounting groove and the second mounting groove and having a "U"-shaped cross-section, the fourth bracket enclosing the second mounting groove part.

The magnet may be fixed to the bracket facing the speed sensor, be installed in contact with a bottom or a side surface of the bracket, and extend in an annular shape.

The magnet may include a first magnet installed at a position facing a side surface of the speed sensor.

The magnet may include a second magnet installed at a position facing an end of the speed sensor.

In an apparatus for measuring a speed of a vehicle having an in-wheel motor in accordance with the present invention, because a magnetic encoder is mounted in a force-fitting manner to a transmission gear configured to be rotated by power transmitted form the in-wheel motor, the position of a measurement target may be changed in various ways. Consequently, the degree of freedom in design may be enhanced.

Furthermore, in the present invention, since the measurement target is installed in the transmission gear rather than being installed at a position facing the bearing, a separate part for preventing oil leakage may be omitted, whereby the productivity may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
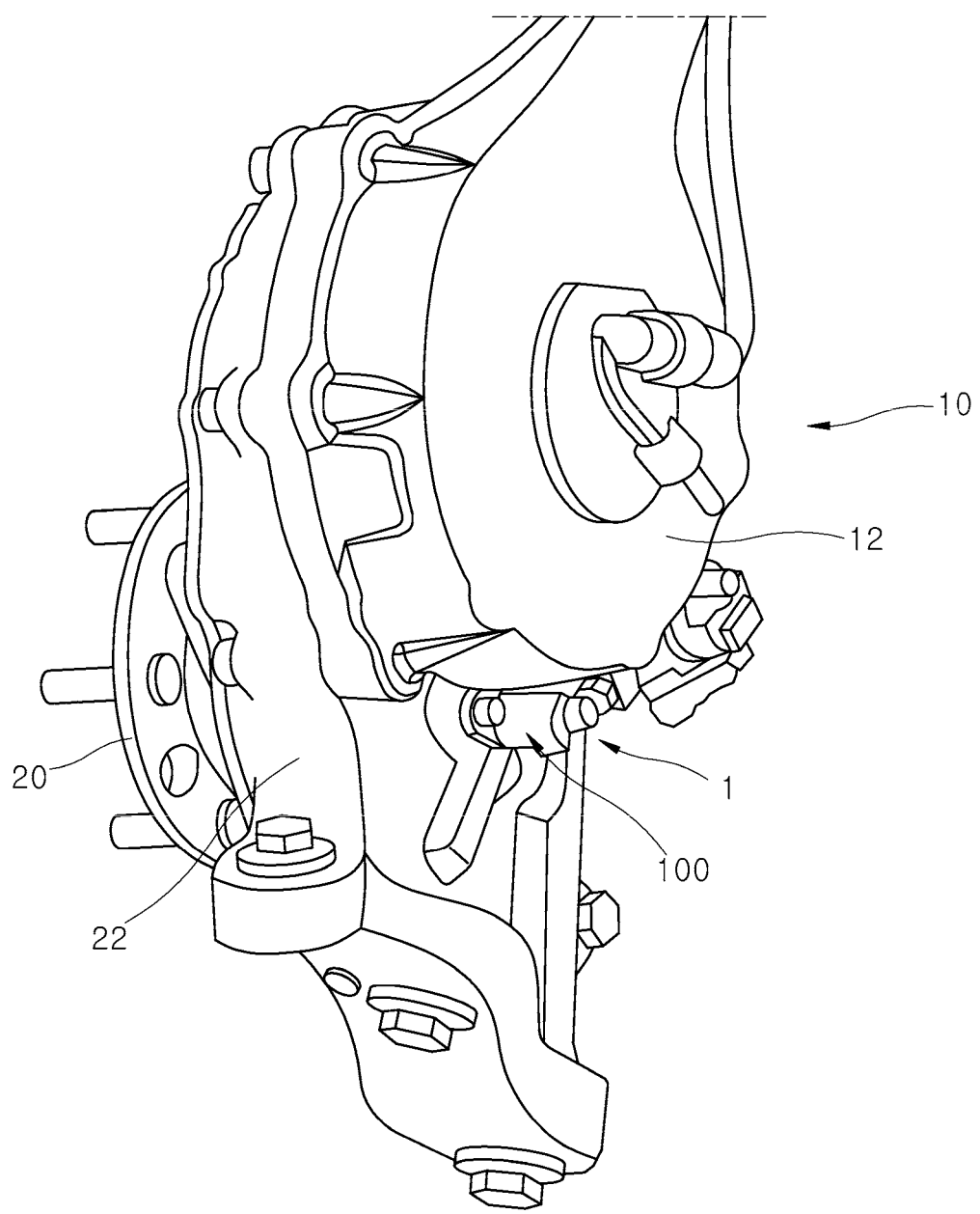
FIGS. 1 and 2 are perspective views schematically illustrating installation of an apparatus for measuring a speed of a vehicle including an in-wheel motor in accordance with an embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an apparatus for measuring a speed of a vehicle having an in-wheel motor in accordance with embodiments of the invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 2:
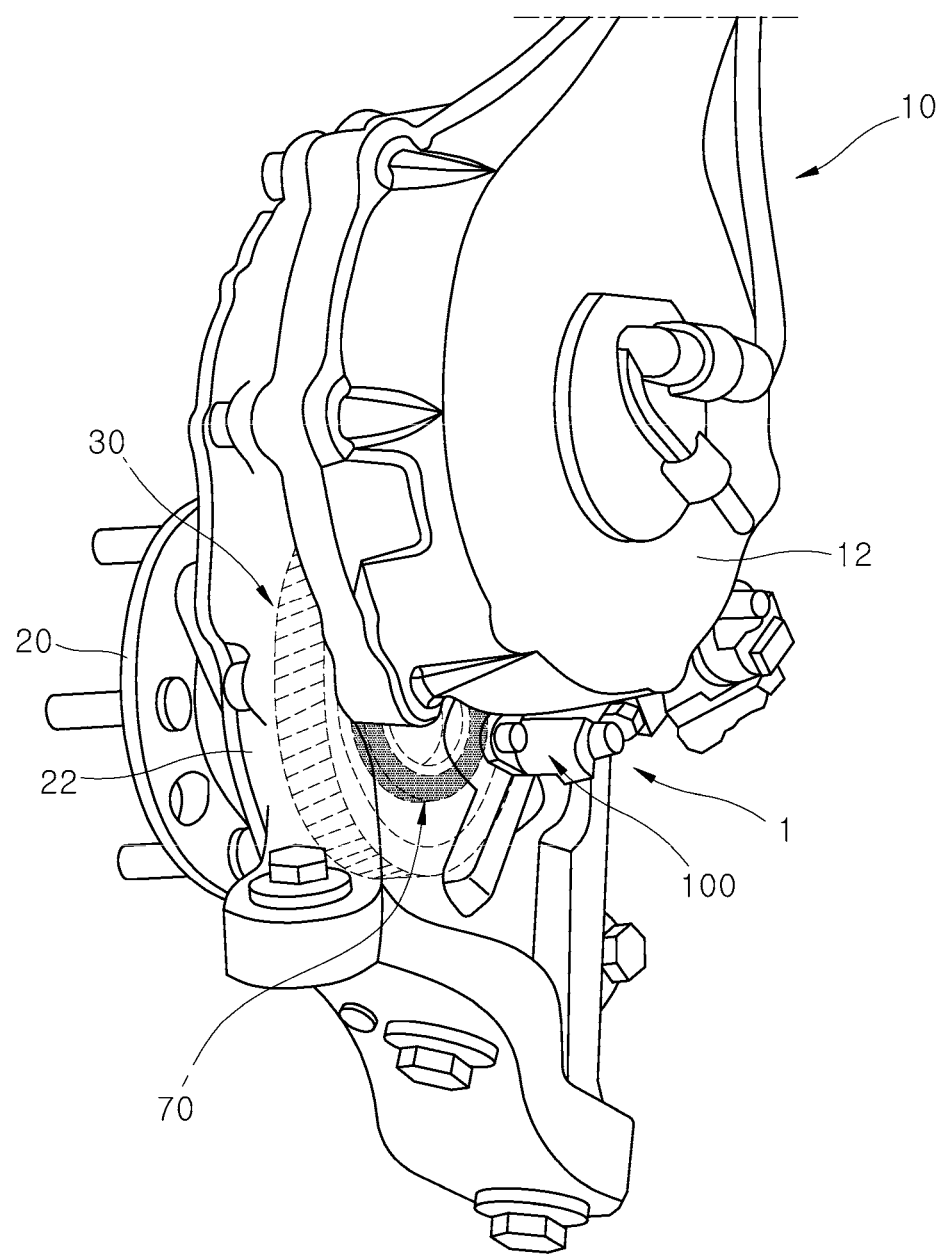
Figure 3:
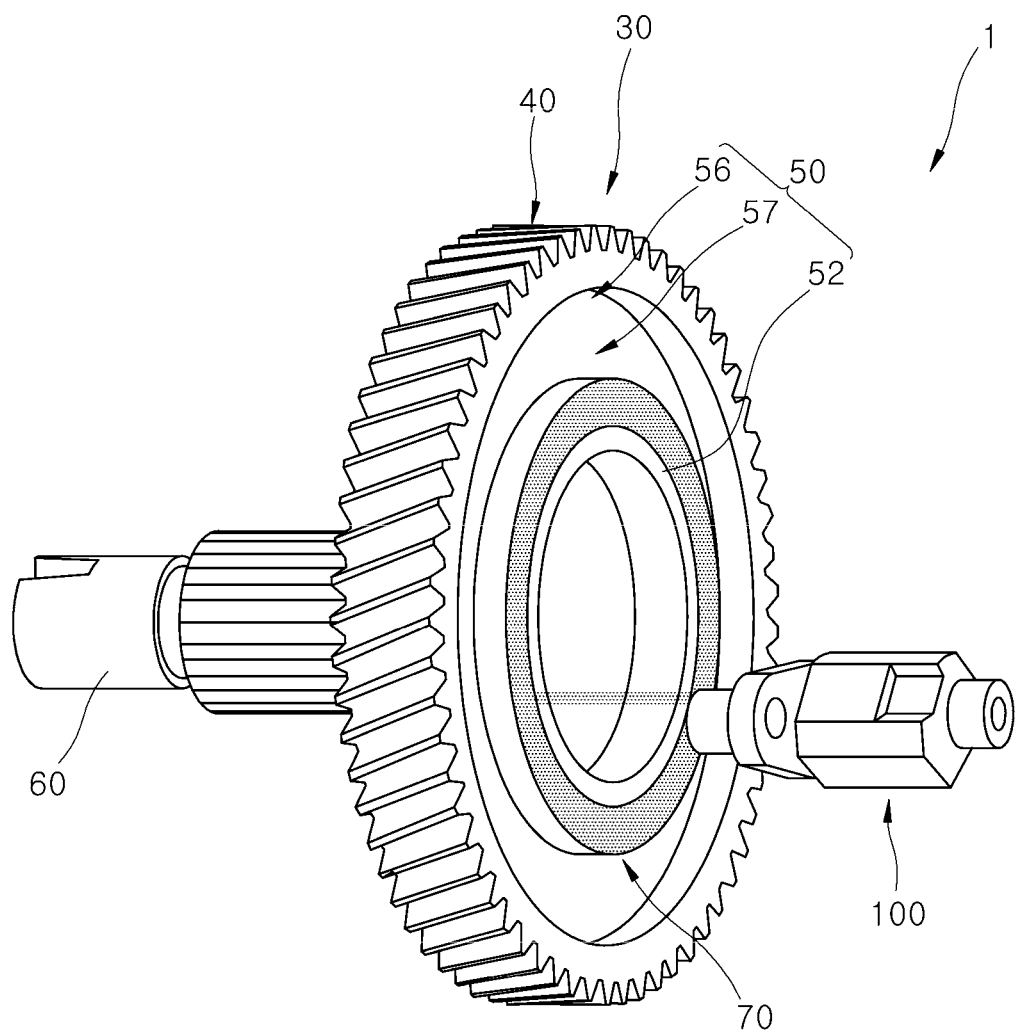
FIG. 3 is a perspective view schematically illustrating the apparatus for measuring the speed of the vehicle including the in-wheel motor in accordance with an embodiment of the present invention.
Figure 4:
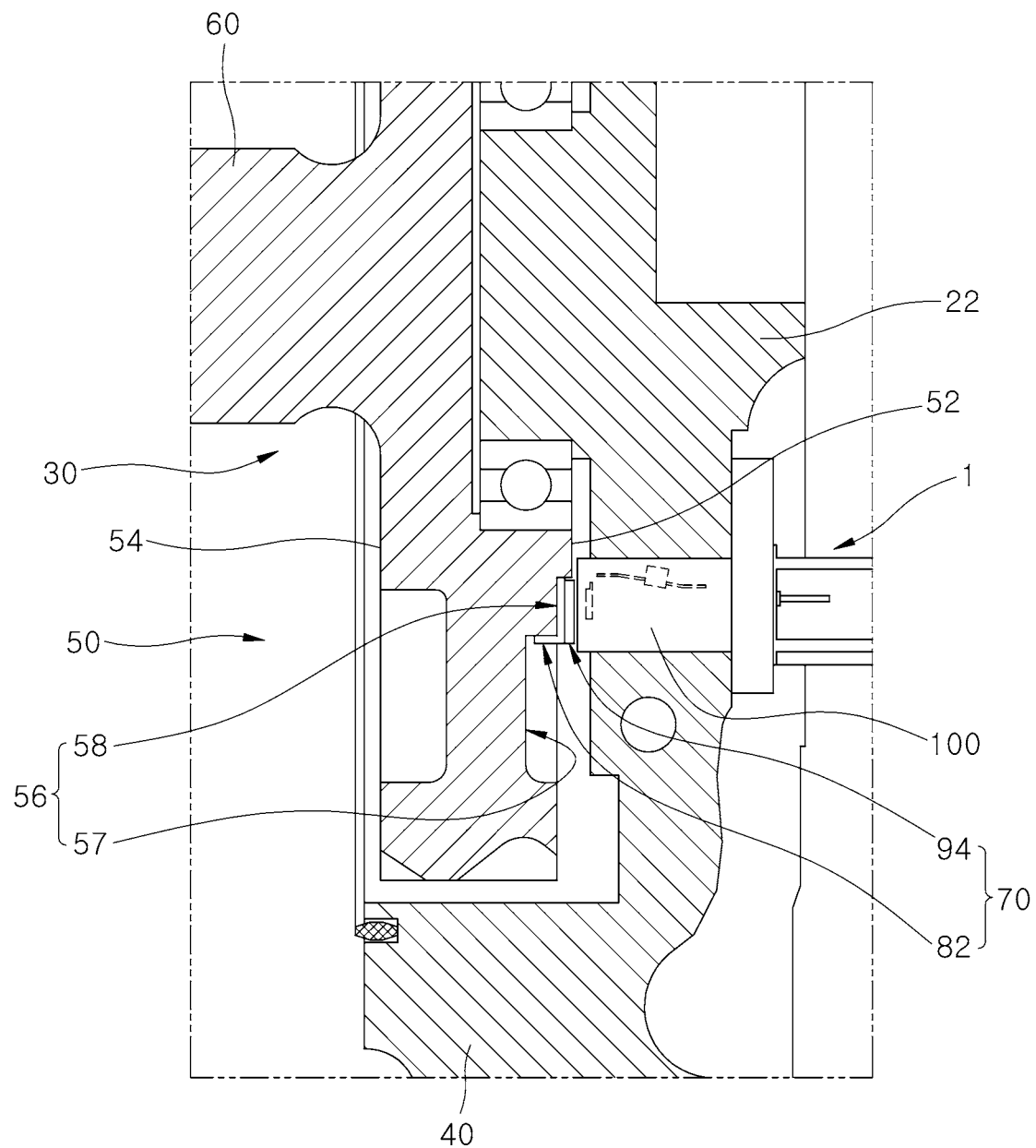
FIGS. 4 and 5 are sectional views illustrating a structure in which a target part to be measured (referred to as "measurement target part") is installed in a second mounting groove in accordance with an embodiment of the present invention.
Figure 5:
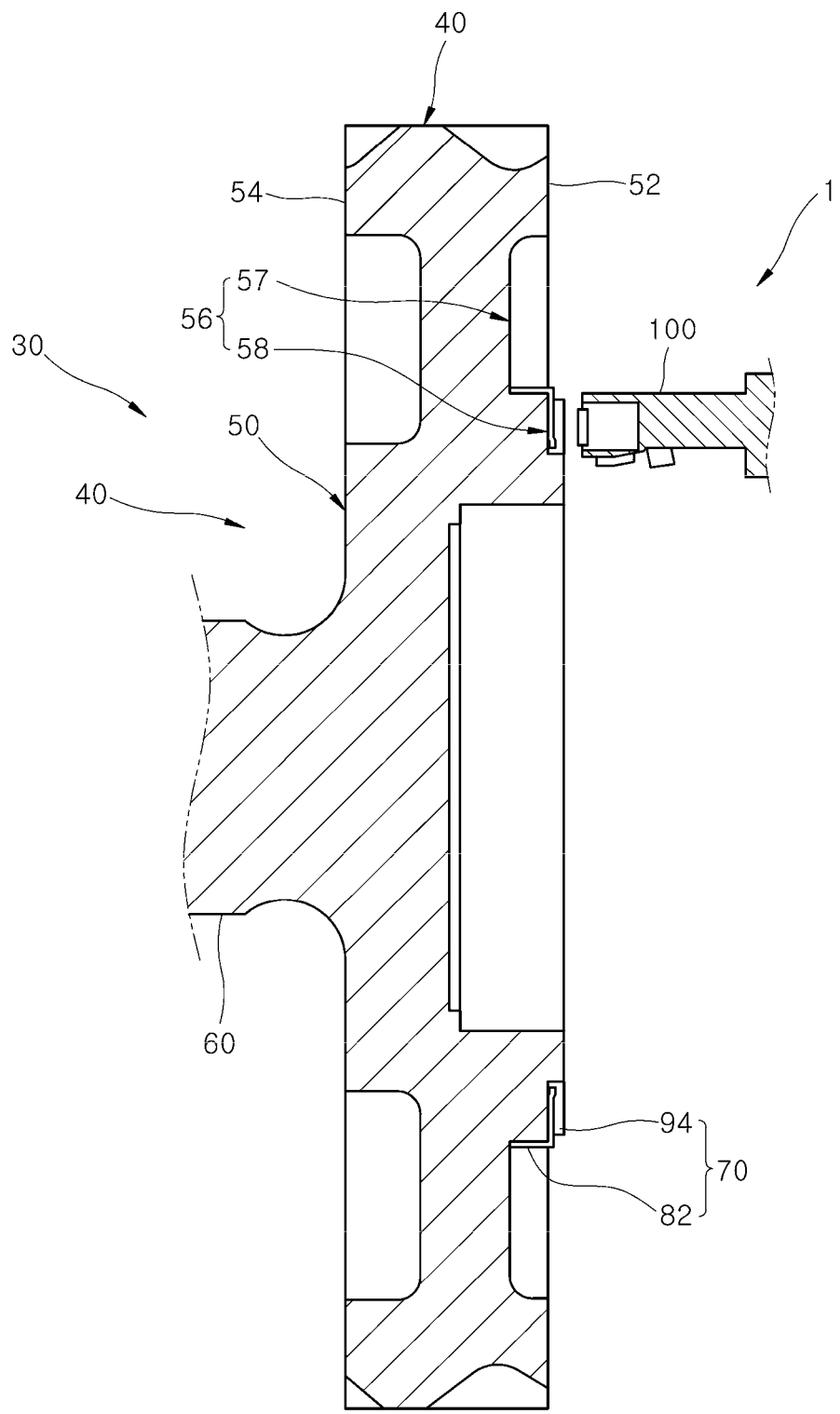
Figure 6:
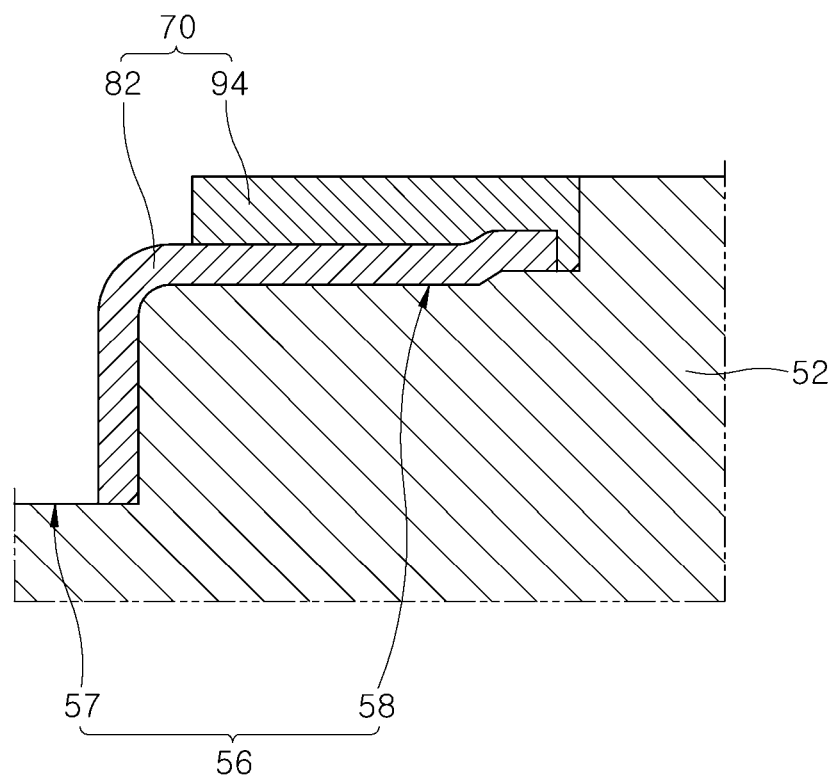
FIG. 6 is a sectional view illustrating a structure in which the measurement target including a first bracket and a second magnet is installed in the second mounting groove in accordance with an embodiment of the present invention.
Figure 14:
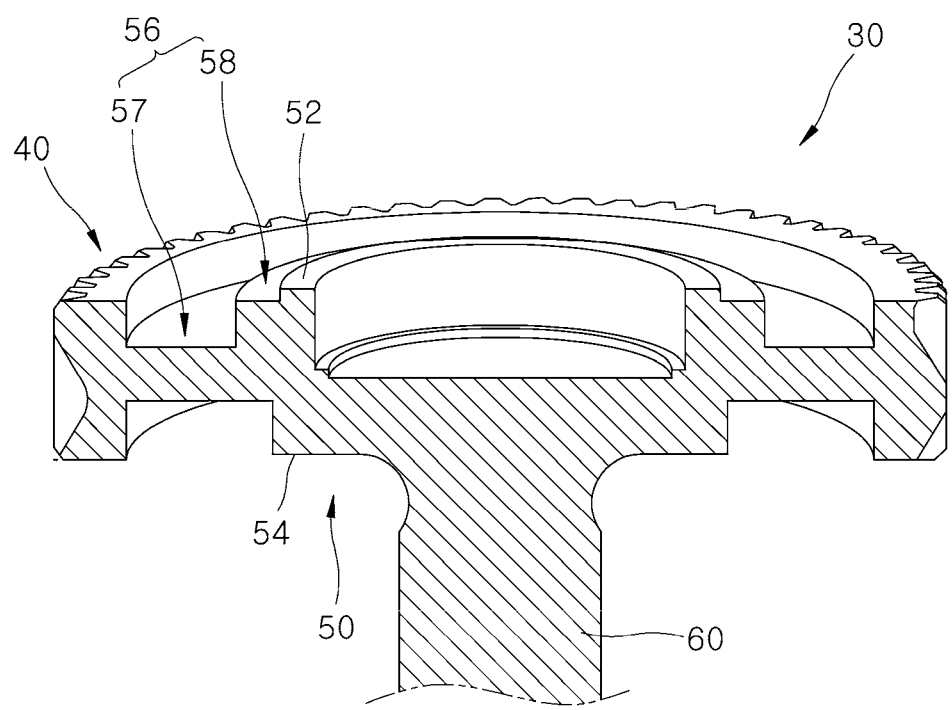
FIG. 14 is a perspective view illustrating a transmission gear in accordance with an embodiment of the present invention.

FIGS. 1 and 2 are perspective views schematically illustrating installation of an apparatus for measuring a speed of a vehicle including an in-wheel motor in accordance with an embodiment of the present invention, FIG. 3 is a perspective view schematically illustrating the apparatus for measuring the speed of the vehicle including the in-wheel motor in accordance with an embodiment of the present invention, FIGS. 4 and 5 are sectional views illustrating a structure in which a target part to be measured (referred to as "measurement target part") is installed in a second mounting groove in accordance with an embodiment of the present invention, FIG. 6 is a sectional view illustrating a structure in which the measurement target including a first bracket and a second magnet is installed in the second mounting groove in accordance with an embodiment of the present invention, and FIG. 14 is a perspective view illustrating a transmission gear in accordance with an embodiment of the present invention.

As shown in FIGS. 1 to 6 and 14, the speed measurement apparatus 1 for the vehicle having the in-wheel motor 10 in accordance with an embodiment of the present invention may include the transmission gear 30, the measurement target 70, and a speed sensor 100. The transmission gear 30 is rotated by power transmitted from the in-wheel motor 10 and has a mounting groove 56 formed along a circumferential direction. The measurement target 70 has magnetic force and is mounted in the mounting groove 56. The speed sensor 100 is installed at a position spaced apart from the measurement target 70 and configured to measure rotation of the measurement target 70.

The in-wheel motor 10 may be embodied using any one of various motors within the technical idea of the present invention in which it supplies power for rotating a wheel connector 20 coupled with a wheel. A housing 12 enclosing the in-wheel motor 10 is installed in a direction toward the inside of the vehicle.

Power generated from the in-wheel motor 10 is transmitted to the wheel connector 20 via a reducer including the transmission gear 30. The transmission gear 30 is disposed inside a cover 22.

The transmission gear 30 may be embodied using any one of various gears within the technical idea of the present invention in which it is rotated by power transmitted from the in-wheel motor 10 and the mounting groove 56 is formed along the circumferential direction in a cover surface 52 facing the speed sensor 100. The transmission gear 30 in accordance with an embodiment may include a gear body 40, a base 50, and a connection rod 60.

The gear body 40 is an annular gear having gear teeth formed along an outer circumferential surface thereof to receive power from the in-wheel motor 10. The power generated from the in-wheel motor 10 is reduced in speed by a separate reducer and then transmitted to the gear body 40, thus rotating the gear body 40.

The base 50 includes the mounting groove 56 and has the form of a plate installed in a shape covering an inner side of the gear body 40. A cover surface 52 is provided on a first side (hereinafter, referred to as "upper side" based on FIG. 14) of the base 50, and a base surface 54 is provided on a second side (hereinafter, referred to as "lower side" based on FIG. 14) of the base 50. The measurement target 70 having magnetic characteristics is fixed in a force-fitting manner in the mounting groove 56 that forms a groove which is concave in a direction from the first side of the base 50 toward the second side thereof.

The mounting groove 56 in accordance with an embodiment may include a first mounting groove 57 which has a groove formed in the circumferential direction inside the base 50 that faces the gear body 40, and a second mounting groove 58 which is stepped from the first mounting groove 57 and has a groove formed in the circumferential direction inside the base 50.

A distance between the bottom of the second mounting groove 58 and the cover surface 52 is shorter than a distance between the bottom of the first mounting groove 57 and the cover surface 52. Therefore, the first mounting groove 57 and the second mounting groove 58 forms a stepped part and defines a circumferential groove inside the cover surface 52. The first mounting groove 57 is installed at a position facing the gear body 40. The second mounting groove 58 installed in succession with the first mounting groove 57 is disposed at a position closer to the center of the base 50 than is the first mounting groove 57. A cross-section of the first and second mounting groove parts 57 and 58 defines a rectangular groove. The connection rod 60 protrudes from the base surface 54 of the base 50 and has a cylindrical shape.

The measurement target 70 may be formed in various shapes within the technical idea of the present invention in which it has magnetic force and is force-fitted into the mounting groove 56. The measurement target 70 in accordance with an embodiment may include a bracket 80 which is inserted into and fixed in the mounting groove 56, and a magnet 90 which is fixed in the bracket 80 and has magnetic characteristics.

The bracket 80 in accordance with an embodiment may include a first bracket 82 which is bent in a shape enclosing an inner corner of the mounting groove 56 and extends in the circumferential direction. The first bracket 82 is bent in an "L" shape, encloses a sidewall of the first mounting groove 57 and the bottom of the second mounting groove 58, and is fixed in the mounting groove 56, for example, by force-fitting or welding. The first bracket 82 is installed in a shape enclosing the corner of a stepped portion connecting the first mounting groove 57 and the second mounting groove 58.

A second magnet 94 is installed in a horizontal direction on an upper portion (based on FIG. 6) of the first bracket 82. Hence, magnetic flux generated from the second magnet 94 is applied upward toward the speed sensor 100 that is disposed over the second magnet 94. An encoder sensing scheme in which the magnet 90 is installed under an end of the speed sensor 100 such that the magnet 90 faces the end of the speed sensor 100 is defined as an axial sensing scheme. An encoder sensing scheme in which the magnet 90 is installed adjacent to a side surface of the speed sensor 100 such that the magnet 90 faces the side surface of the speed sensor 100 is defined as a radial sensing scheme.

The magnet 90 in accordance with an embodiment may employ a first magnet 92 installed at a position facing the side surface of the speed sensor 100, or may employ a second magnet 94 installed at a position facing the end of the speed sensor 100.

In the case where the encoder sensing scheme is the axial sensing scheme, the magnet 90 is installed in a horizontal direction inside the mounting groove 56. In more detail, the magnet 90 may be installed in the horizontal direction on the bottom of the first mounting groove 57 to have a shape facing the lower end of the speed sensor 100, so that the magnetic flux of the magnet 90 is applied upward toward the speed sensor 100. Alternatively, the magnet 90 may be installed in the horizontal direction on the bottom of the second mounting groove 58 to have a shape facing the lower end of the speed sensor 100, so that the magnetic flux of the magnet 90 is applied upward toward the speed sensor 100.

In the case where the encoder sensing scheme is the radial sensing scheme, the magnet 90 is installed in a vertical direction inside the mounting groove 56. In more detail, the magnet 90 may be installed in the vertical direction on the sidewall of the first mounting groove 57 to have a shape facing the side surface of the speed sensor 100, so that the magnetic flux of the magnet 90 is applied in the horizontal direction toward the speed sensor 100. Alternatively, the magnet 90 may be installed in the vertical direction on the sidewall of the second mounting groove 58 to have a shape facing the side surface of the speed sensor 100, so that the magnetic flux of the magnet 90 is applied in the horizontal direction toward the speed sensor 100.

Furthermore, the magnet 90 is fixed to the bracket 80 facing the speed sensor 100, is installed in contact with the bottom or a side surface of the bracket 80, and extends in an annular shape.

Figure 7:
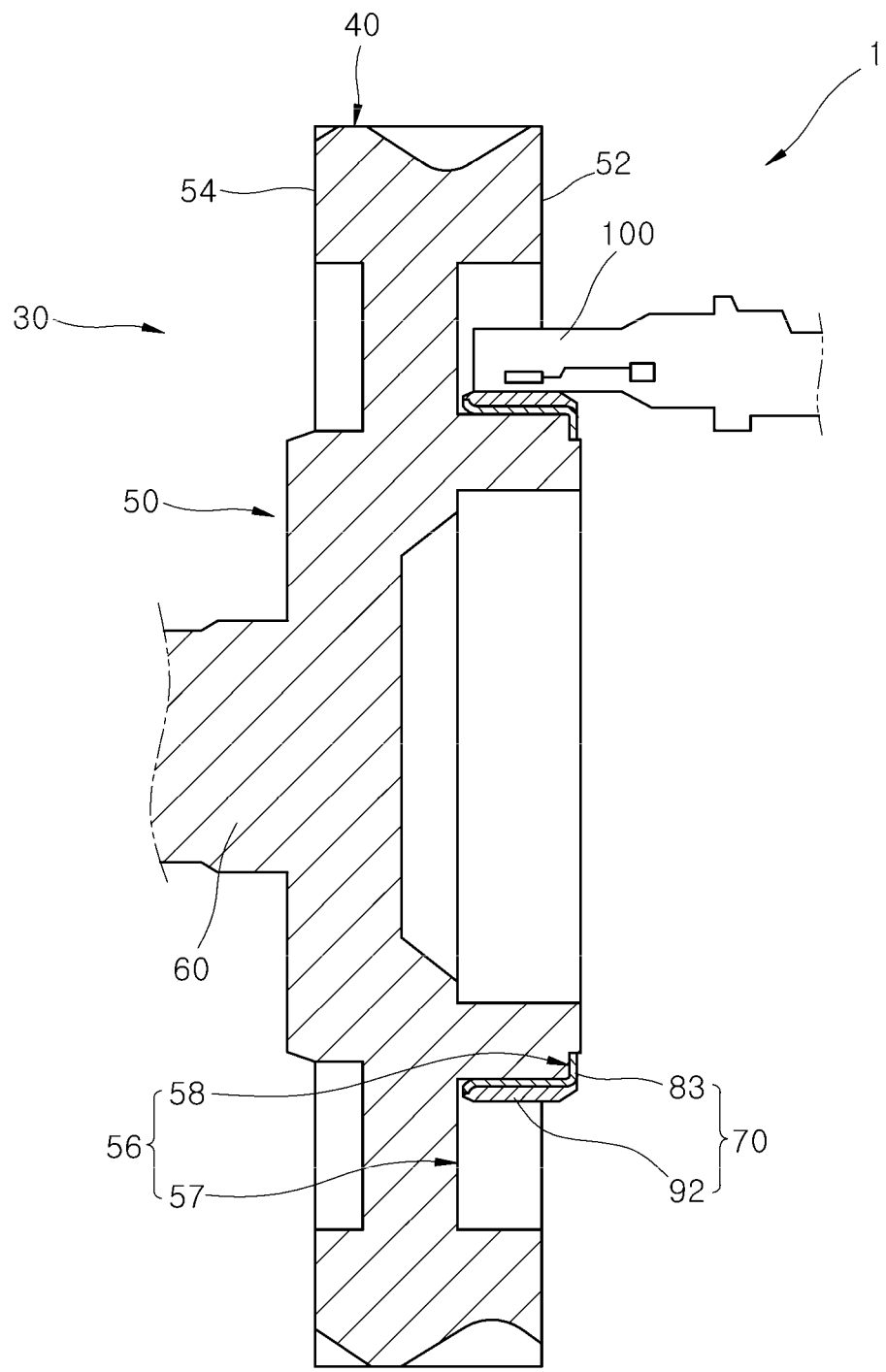
FIGS. 7 and 8 are sectional views illustrating a structure in which a measurement target including a first bracket and the first magnet is installed on a sidewall of a first mounting groove in accordance with an embodiment of the present invention.
Figure 8:
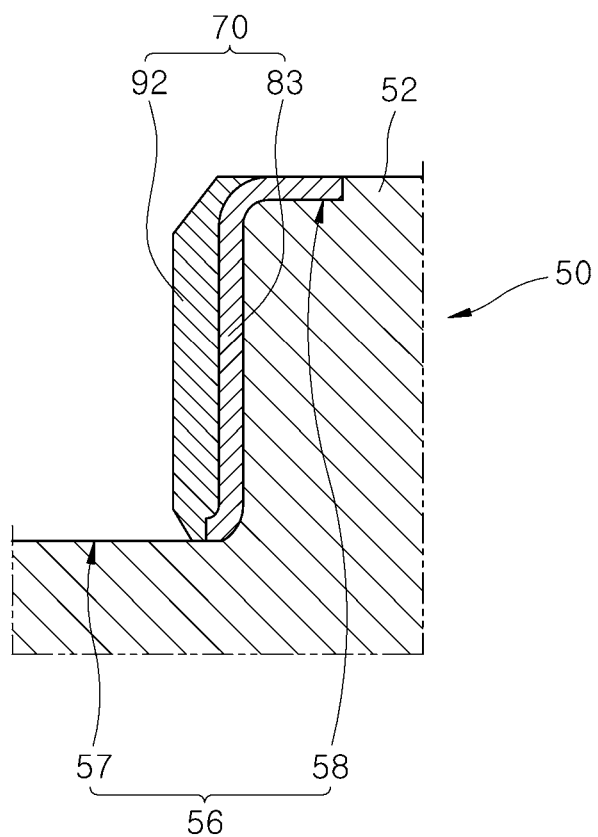

FIGS. 7 and 8 are sectional views illustrating a structure in which a measurement target including a first bracket and the first magnet is installed in the first mounting groove in accordance with an embodiment of the present invention.

As shown in FIGS. 7 and 8, the first bracket 83 may be installed in the vertical direction inside the mounting groove 56, and the first magnet 92 may be fixed to an outer surface of the first bracket 83 and installed in the vertical direction. The first bracket 83 has an "L" shape and is fixed in a shape covering the sidewall of the first mounting groove 57 and the bottom of the second mounting groove 58. The first magnet 92 is fixed to the outer surface of the first bracket 83 that faces the sidewall of the first mounting groove 57. The first magnet 92 is oriented in the vertical direction and installed in a shape facing a side portion of the speed sensor 100 so that magnetic flux is formed in a horizontal direction toward the speed sensor 100.

Although the first bracket 82 shown in FIG. 6 and the first bracket 83 shown in FIG. 7 have "L"-shaped cross-sections, they are different in horizontal length and vertical length from each other, so that they have the same part name but are denoted by different reference numerals.

Figure 9:
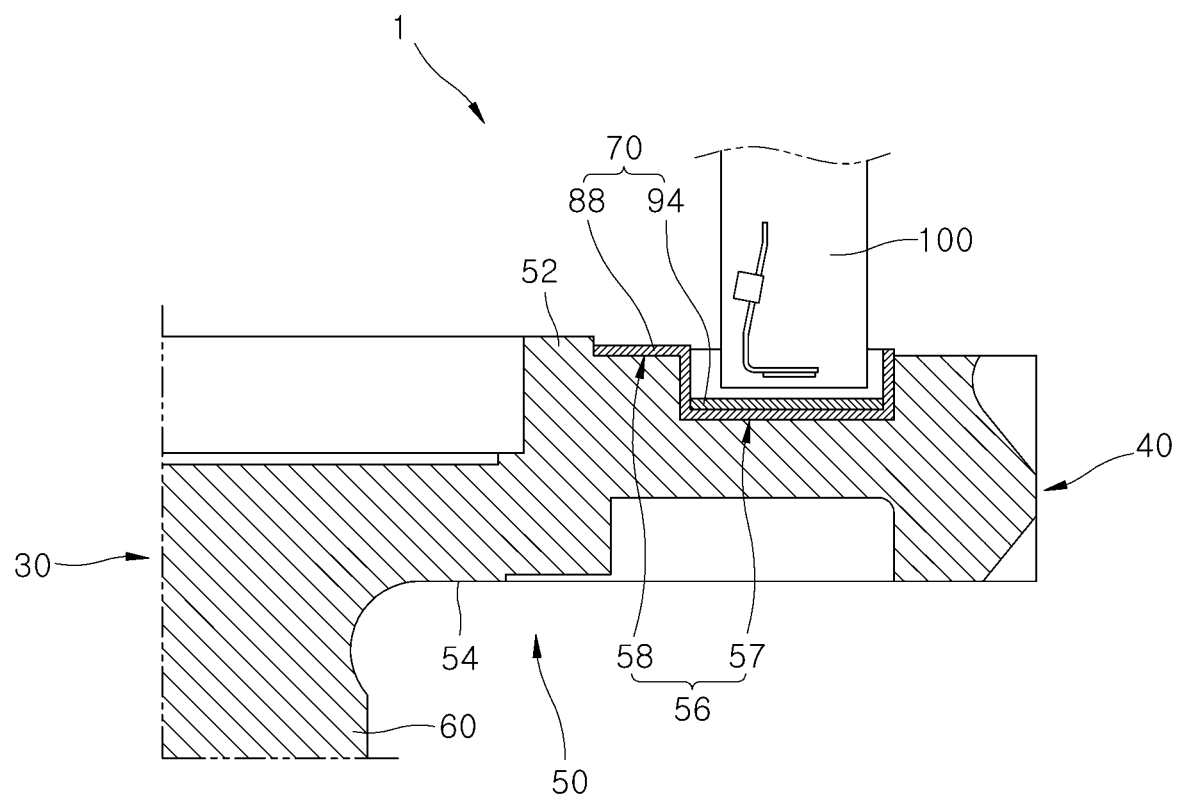
FIG. 9 is a sectional view illustrating a structure in which a measurement target including a fourth bracket and the second magnet is fixed in the mounting groove in a force-fitting manner in accordance with an embodiment of the present invention.
Figure 10:
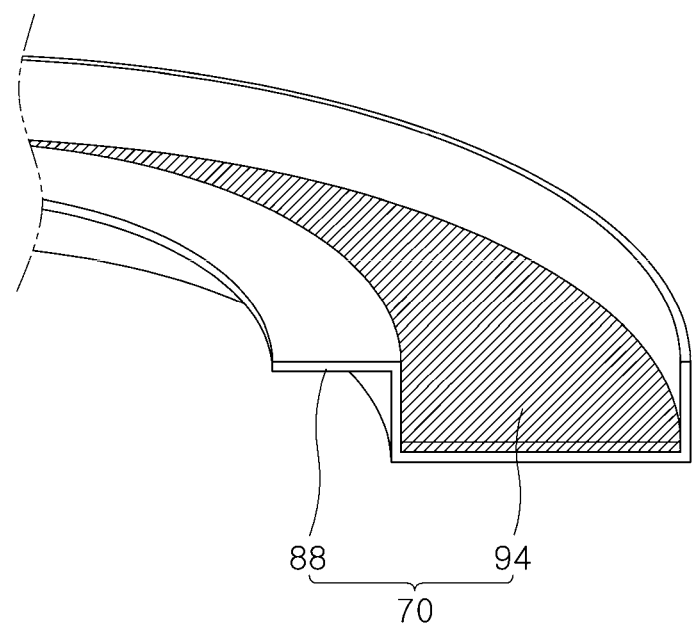
FIG. 10 is a perspective view illustrating the measurement target including the fourth bracket and the second magnet in accordance with an embodiment of the present invention.

FIG. 9 is a sectional view illustrating a structure in which a measurement target including a fourth bracket and the second magnet is fixed in the mounting groove in a force-fitting manner in accordance with an embodiment of the present invention, and FIG. 10 is a perspective view illustrating the measurement target including the fourth bracket and the second magnet in accordance with an embodiment of the present invention.

As shown in FIGS. 9 and 10, the bracket 80 may include a fourth bracket 88 which is fixed in a force-fitting manner in both the first mounting groove 57 and the second mounting groove 58. The fourth bracket 88 has a cross-sectional shape corresponding to both a groove shape of the first mounting groove 57 and a groove shape of the second mounting groove 58. The cross-section of the fourth bracket 88 in accordance with an embodiment has a "U" shape which is open on an upper side thereof, with a wing part covering the bottom of the second mounting groove 58. The second magnet 94 is disposed in the fourth bracket 88 at a position facing a lower end of the speed sensor 100. The second magnet 94 has a rectangular cross-sectional shape and is installed in the horizontal direction. Furthermore, the second magnet 94 is installed in the form of a ring along the mounting groove 56, and configured to rotated along with the transmission gear 30. The second magnet 94 has a structure such that N poles and S poles are alternately formed. Thus, the magnetic flux varies when the second magnet 94 rotates. Consequently, the speed sensor 100 may measure the speed of the vehicle by sensing the variation in the magnetic flux.

Figure 11:
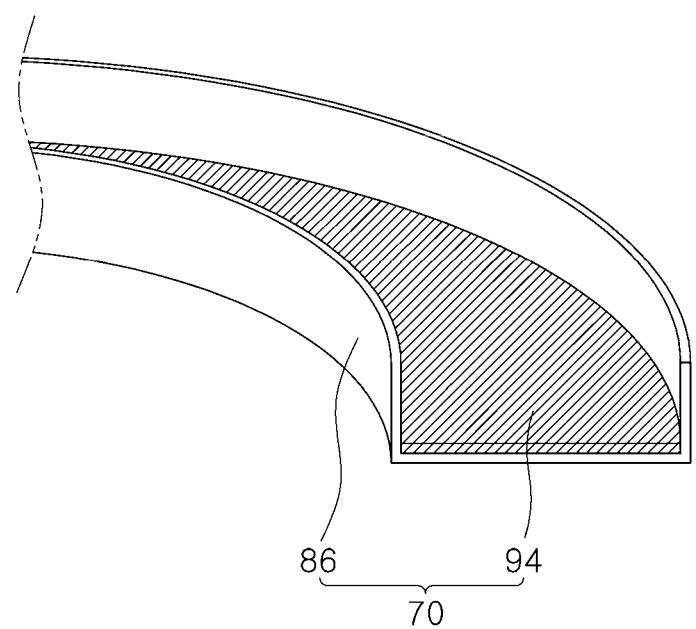
FIG. 11 is a perspective view illustrating a measurement target including a third bracket and the second magnet in accordance with an embodiment of the present invention.

FIG. 11 is a perspective view illustrating a measurement target including a third bracket and the second magnet in accordance with an embodiment of the present invention.

As shown in FIG. 11, in the bracket 80, the third bracket 86 having a "U"-shaped cross-section which is open on an upper side thereof may be fixed in a force-fitting manner in the mounting groove 56. The second magnet is installed on the bottom of the third bracket 86 so that an encoder sensing operation is performed in an axial sensing manner. The third bracket 86 having the above-mentioned structure may be modified in various shapes within the technical idea of the present invention in which it is force-fitted into the mounting groove 56 and has an annular shape having a "U"-shaped cross-section.

Figure 12:
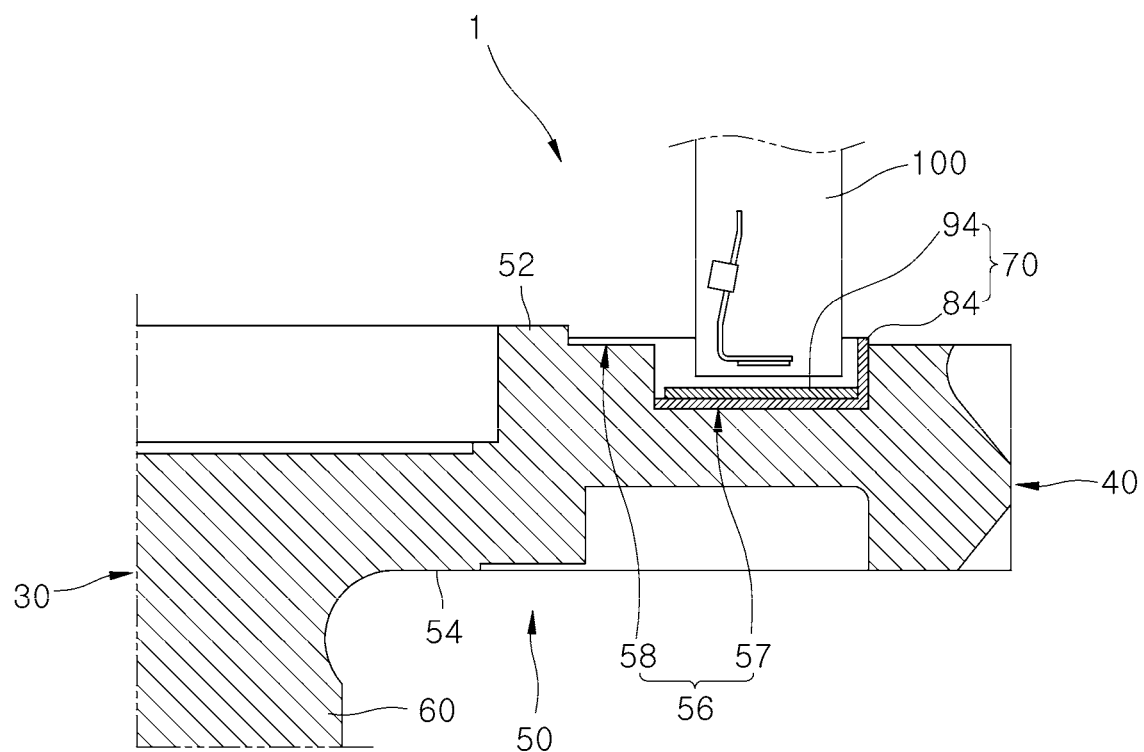
FIG. 12 is a sectional view illustrating a structure in which a measurement target including a second bracket and the second magnet is installed in the first mounting groove in accordance with an embodiment of the present invention.
Figure 13:
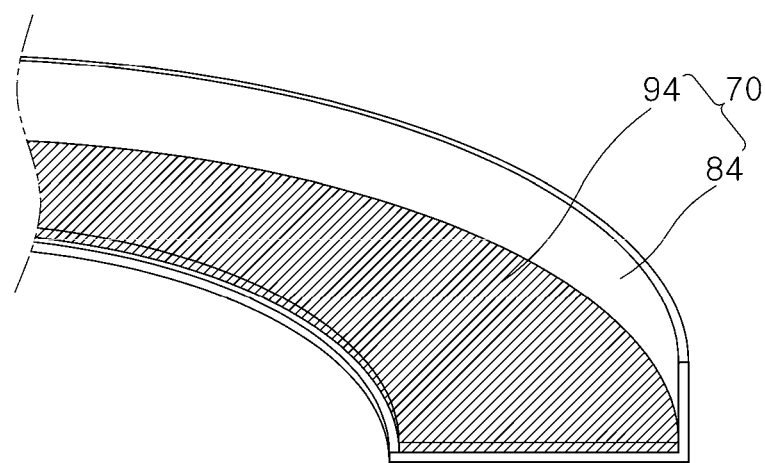
FIG. 13 is a perspective view illustrating the measurement target including the second bracket and the second magnet in accordance with an embodiment of the present invention.

FIG. 12 is a sectional view illustrating a structure in which a measurement target including a second bracket and the second magnet is fixed in the first mounting groove in accordance with an embodiment of the present invention, and FIG. 13 is a perspective view illustrating the measurement target including the second bracket and the second magnet in accordance with an embodiment of the present invention.

As shown in FIGS. 12 and 13, in the bracket 80, the second bracket 84 having an "L"-shaped cross-section may be fixed in a force-fitting manner in the mounting groove 56. The second magnet 94 is installed on the bottom of the second bracket 84 so that an encoder sensing operation is performed in an axial sensing manner. The second bracket 84 having the above-mentioned structure may be modified in various shapes within the technical idea of the present invention in which it is formed in an annular shape having an "L"-shaped cross-section.

The speed sensor 100 may be embodied using any one of various sensors within the technical idea of the present invention in which it is installed at a position spaced apart from the measurement target 70 and configured to measure the rotation of the measurement target 70. The speed sensor 100 in accordance with an embodiment may be installed at a position facing the cover surface 52 of the transmission gear 30, or may be installed inside the mounting groove 56.

In this specification and the appended claims, the installation position and the number of measurement target parts 70 may be modified in various ways within the technical idea in which they are fixed in a force-fitting manner in the transmission gear 30.

Hereinafter, the operation of the speed measurement apparatus 1 for the vehicle having the in-wheel motor in accordance with an embodiment of the present invention will be described in detail with reference to the accompanying drawings.

As shown in FIGS. 1 to 6, the first bracket 82 and the second magnet 94 that form a single module is force-fitted into and fixed in the mounting groove 56 of the transmission gear 30. Therefore, when the transmission gear 30 is rotated by power transmitted from the in-wheel motor 10, the first bracket 82 and the second magnet 94 are also rotated, the magnetic flux of the second magnet 94 varies.

The speed sensor 100 that senses the variation in the magnetic flux transmits a measured value to a controller of the vehicle. In this way, the operation of measuring the speed of the vehicle is performed.

As shown in FIGS. 7 to 13, the measurement target 70 may be formed by a combination of various brackets 80 and various magnets 90. The measurement target 70 formed by the foregoing method is coupled to the mounting groove 56 of the transmission gear 30.

As shown in FIG. 14, the measurement target 70 may be selectively installed on the sidewall or the bottom of the mounting groove 56 of the transmission gear 30, so that the installation position of the speed sensor 100 may be changed as needed.

As described above, in accordance with the present invention, because a magnetic encoder is mounted in a force-fitting manner to the transmission gear 30 that is configured to be rotated by power transmitted form the in-wheel motor 10, the position of the measurement target 70 may be changed in various ways. Consequently, the degree of freedom in design may be enhanced. Furthermore, since the measurement target 70 is installed in the transmission gear 30 rather than being installed at a position facing the bearing, a separate part for preventing oil leakage may be omitted, whereby the productivity may be improved.

Although preferred embodiments of the invention have been disclosed for illustrative purposes, those skilled in the art will appreciate that various modifications, additions and substitutions are possible, without departing from the scope and spirit of the invention as defined in the accompanying claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An apparatus for measuring a speed of a vehicle having an in-wheel motor, comprising:
    a transmission gear configured to be rotated by power transmitted from the in-wheel motor, and comprising a mounting groove formed along a circumferential direction;
    a measurement target having a magnet with magnetic force and a bracket, the magnet fixed to the bracket; and
    a speed sensor installed at a position spaced apart from the measurement target and configured to measure rotation of the measurement target,
    wherein the transmission gear comprises:
    a gear body having an annular shape and comprising gear teeth formed along an outer circumferential surface of the gear body to receive the power of the in-wheel motor;
    a base comprising the mounting groove and installed in a shape covering an inner side of the gear body; and
    a connection rod protruding from the base,
    wherein the mounting groove of the transmission gear comprises:
    a first mounting groove having a groove formed in a circumferential direction inside the base facing the gear body; and
    a second mounting groove stepped from the first mounting groove and having a groove formed in the circumferential direction inside the base, wherein:

the speed sensor and the magnet are inserted into the first mounting groove, and the bracket is fixed in a force-fitting manner in both the first mounting groove and the second mounting groove.

2. The apparatus of claim 1, wherein the bracket is bent in a shape enclosing an inner corner of the mounting groove, the bracket extending in the circumferential direction.

3. The apparatus of claim 1, wherein the bracket has an annular shape with an "L"-shaped cross-section.

4. The apparatus of claim 1, wherein the bracket has an annular shape with a "U"-shaped cross-section.

5. The apparatus of claim 1, wherein the bracket has a "U"-shaped cross-section, the bracket enclosing the second mounting groove.

6. The apparatus of claim 1, wherein the magnet is fixed to the bracket facing the speed sensor, is installed in contact with a bottom or a side surface of the bracket, and extends in an annular shape.

7. The apparatus of claim 6, wherein the magnet is installed at a position facing a side surface of the speed sensor.

8. The apparatus of claim 6, wherein the magnet is installed at a position facing an end of the speed sensor.

* * * * *